(12) United States Patent
Imanishi

(10) Patent No.: US 7,699,747 B2
(45) Date of Patent: Apr. 20, 2010

(54) TOROIDAL-TYPE CONTINUOUSLY VARIABLE TRANSMISSION

(75) Inventor: Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 54 days.

(21) Appl. No.: 11/505,915

(22) Filed: Aug. 18, 2006

(65) Prior Publication Data

US 2006/0276299 A1    Dec. 7, 2006

Related U.S. Application Data

(62) Division of application No. 10/300,894, filed on Nov. 21, 2002, now abandoned.

(30) Foreign Application Priority Data

Nov. 22, 2001    (JP)    ............ P. 2001-357151

(51) Int. Cl.
*F16H 15/38*    (2006.01)
(52) U.S. Cl. .............. 476/42; 29/423; 451/63
(58) Field of Classification Search ........... 29/423; 451/51, 52
See application file for complete search history.

(56) References Cited

U.S. PATENT DOCUMENTS

| | | | |
|---|---|---|---|
| 3,306,119 A * | 2/1967 | De Brie Perry et al. | ....... 476/10 |
| 5,607,372 A | 3/1997 | Lohr | |
| 5,980,420 A | 11/1999 | Sakamoto et al. | |
| 6,074,324 A | 6/2000 | Ishikawa et al. | |
| 6,572,452 B2 * | 6/2003 | Hatase et al. | ....... 451/51 |
| 6,656,080 B2 | 12/2003 | Watanabe et al. | |
| 2002/0013123 A1 * | 1/2002 | Kamamura et al. | ....... 451/53 |

FOREIGN PATENT DOCUMENTS

| | | |
|---|---|---|
| EP | 0 361 446 | 4/1990 |
| JP | 2000-61702 | 2/2000 |
| JP | 2000-104804 | 4/2000 |

* cited by examiner

*Primary Examiner*—William C Joyce
(74) *Attorney, Agent, or Firm*—Sughrue Mion, PLLC

(57) ABSTRACT

A toroidal-type continuously variable transmission, has a first continuously variable transmission mechanism and a second continuously variable transmission mechanism: wherein the first and second continuously variable transmission mechanisms are disposed coaxially with each other; the first and second input disks are connected together so as to be rotated in synchronization with each other; the first and second output disks are formed as a unified type output disk including traction surfaces on the two side surfaces thereof; on the side portion at the outer-most outside diameter of the unified type output disk, there is formed a datum plane serving as a machining datum when the traction surfaces are processed; and, an operation for finishing the datum plane is carried out after the unified type output disk is heat treated.

1 Claim, 3 Drawing Sheets

TOROIDAL-TYPE CONTINUOUSLY VARIABLE TRANSMISSION

This is a divisional of application Ser. No. 10/300,894 filed Nov. 21, 2002 now abandoned. The entire disclosure of the prior application, application Ser. No. 10/300,894 is hereby incorporated by reference.

BACKGROUND OF THE INVENTION

1. Field of the Invention

The present invention relates to a toroidal-type continuously variable transmission.

2. Description of the Related Art

Conventionally, as a toroidal-type continuously variable transmission, there is known an apparatus structured such that first and second continuously variable transmission mechanisms are disposed coaxially with each other: specifically, the first continuously variable transmission mechanism comprises a first input disk, a first output disk disposed so as to be opposed to the first input disk and a pair of power rollers respectively held between the first input and output disks; the second continuously variable transmission mechanism comprises a second input disk, a second output disk disposed so as to be opposed to the second input disk and a pair of power rollers respectively held between the second input and output disks; the first and second continuously variable transmission mechanisms are disposed such that the first and second input disks are disposed so as to be opposed to each other in the axial direction thereof; the first and second input disks are connected together so as to be rotated in synchronization with each other; and, the first and second output disks can be rotated integrally with each other.

By the way, for example, in JP-A-2000-104804 and U.S. Pat. No. 5,607,372, there is disclosed an apparatus in which the above-mentioned first and second output disks are structured as a unified type output disk including on the two sides thereof traction surfaces to be contacted with the above-mentioned pair of first power rollers and the above-mentioned pair of second power rollers.

However, the unified type output disk cannot be processed with high precision and, especially, the traction surfaces of the unified type output disk are difficult to work.

That is, when working the traction surfaces, there are necessary surfaces which can be used as machining datum. One of them is a datum surface which can be used to restrict the whirling of the unified type output disk in the rotation direction thereof; and as this datum surface, there is used a portion of the outside diameter portion of the unified type output disk. As the other datum surface, there is necessary a datum plane which is used to fix the unified output disk in the axial direction thereof. However, in the case of the unified type output disk disclosed in either of the above-cited JP-A-2000-104804 or U.S. Pat. No. 5,607,372, the plane of the near-to-inside diameter portion of the unified type output disk must be used as the machining datum surface; and, therefore, when working the traction surfaces, the whirling of the outside diameter portion of the unified type output disk increases, with the result that, when grinding or superfinishing the disk, the traction surfaces cannot be ground with high precision. Such poor surface precision of the traction surfaces not only can lower the power transmission efficiency of the unified type output disk but also can make the gear change operation thereof unstable.

SUMMARY OF THE INVENTION

The present invention aims at eliminating the above-mentioned drawbacks found in the conventional toroidal-type continuously variable transmission. Accordingly, it is an object of the invention to provide a toroidal-type continuously variable transmission which uses a unified type output disk allowing its traction surfaces to be processed with high precision, thereby being able not only to enhance the power transmission efficiency thereof but also to prevent the gear change operation from being unstabilized.

In attaining the above object, according to a first aspect of the invention, there is provided a toroidal-type continuously variable transmission, comprising a first continuously variable transmission mechanism and a second continuously variable transmission mechanism: the first continuously variable transmission mechanism including a first input disk, a first output disk disposed so as to be opposed to the first input disk and, a pair of first power rollers respectively held between the first input and output disks; and, the second continuously variable transmission mechanism including a second input disk, a second output disk disposed so as to be opposed to the second input disk and, a pair of second power rollers respectively held between the second input and output disks, wherein the first and second continuously variable transmission mechanisms are disposed coaxially with each other; the first and second input disks are connected together so as to be rotated in synchronization with each other; the first and second output disks can be rotated integrally with each other; the first and second output disks are formed as a unified type output disk including on the two side surfaces thereof traction surfaces to be contacted with the pair of first power rollers and the pair of second power rollers; on the side portion at the outer-most outside diameter of the unified type output disk, there is formed a datum plane serving as a machining datum when the traction surfaces are processed; and, an operation for finishing the datum plane is carried out after the unified type output disk is heat treated.

Also, according to the invention, as a machining datum, instead of the datum plane, there can also be used a stepped portion which is formed in the end face at the outer-most outside diameter of the unified type output disk. And, the stepped portion may be cut and removed after the traction surfaces of the unified type output disk are processed.

Further, according to the invention, as the machining datum, instead of the datum plane or stepped portion, there can also be used a groove portion which is formed in the end face at the outer-most outside diameter of the unified type output disk.

DETAILED DESCRIPTION OF THE PREFERRED EMBODIMENTS

Now, description will be given below of an embodiment of a toroidal-type continuously variable transmission according to the invention with reference to the accompanying drawings.

Figure 1:
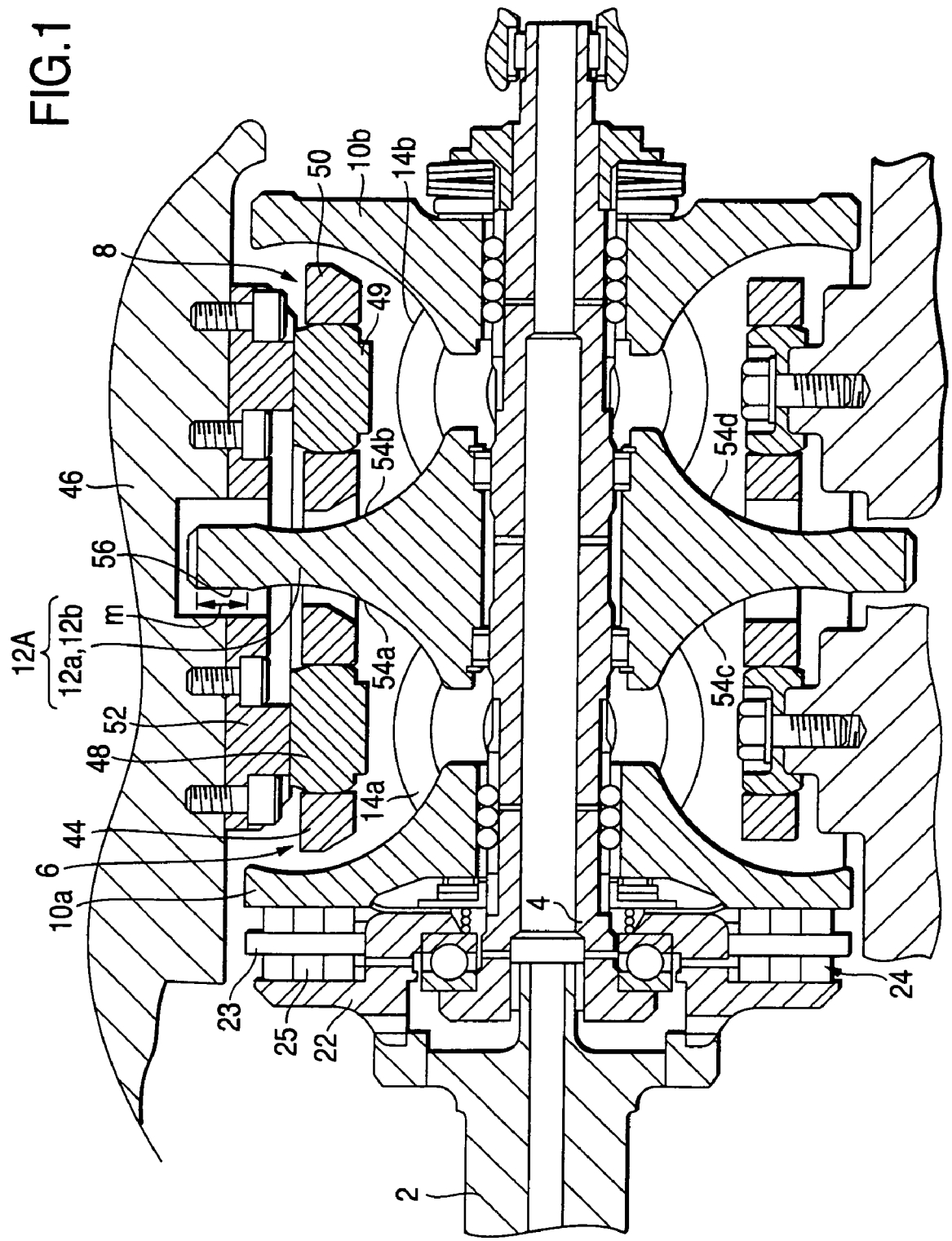
FIG. 1 is a section view of a toroidal-type continuously variable transmission incorporating a unified type output disk according to a first embodiment of the invention.

In FIG. 1, reference character 2 designates an input shaft to which power from an engine (not shown) is input; and, a main shaft 4 is rotatably disposed in such a manner that their respective end faces are butted against each other.

On the main shaft 4, there are disposed a first continuously variable transmission mechanism 6 and a second continuously variable transmission mechanism 8 in such a manner that they are coaxial with each other. The first continuously variable transmission mechanism 6 comprises a first input disk 10a and a first output disk 12a disposed so as to be opposed to each other, and a pair of power rollers 14a (only one of the first power rollers 14a is shown) respectively interposed between the first input and output disks 10a, 12a; and, the second continuously variable transmission mechanism 8 comprises a second input disk 10b and a second output disk 12b disposed so as to be opposed to each other, and a pair of power rollers 14b (only one of the second power rollers 14b is shown) respectively interposed between the second input and output disks 10b, 12b.

The mutually opposed surfaces of the respective input disks 10a, 10b and output disks 12a, 12b are respectively formed as traction surfaces; and, in a state where the first and second power rollers 14a, 14b are in contact with the input disks 10a, 10b and output disks 12a, 12b, the first and second power rollers 14a, 14b can be swung.

And, between the first input disk 10a of the first continuously variable transmission mechanism 6 and main shaft 4, there is interposed a loading cam device 24. This loading cam device 24 comprises a cam flange 22, which is engaged with the input shaft 2 and can be rotated integrally therewith, and a plurality of rollers 25 rollably held between the cam flange 22 and first input disk 10a by a retainer 23. The torque of the input shaft 2 can be input through the loading cam device 24 to the first input disk 10a.

On the other hand, since the first and second output disks 12a, 12b are respectively connected to an output gear (not shown), two kinds of torque respectively transmitted to the first and second output disks 12a, 12b are collected together to the output gear, and the thus collected torque is transmitted to an output shaft (not shown) through a drive gear (not shown) in meshing engagement with the output gear.

A first trunnion (not shown) for supporting the first power roller 14a of the first continuously variable transmission mechanism 6 is supported by a needle roller bearing (not shown) in such a manner that it can be rotated and can be moved in the vertical direction; and, this needle roller bearing is supported by a yoke 44, while the yoke 44 is supported on a post 48 which fixedly secured to a casing 46.

A second trunnion (not shown) for supporting the second power roller 14b of the second continuously variable transmission mechanism 8 is supported by a needle roller bearing (not shown) in such a manner that it can be rotated and can be moved in the vertical direction; and, this needle roller bearing is supported by a yoke 50, while the yoke 50 is supported on a post 49 which fixedly secured to the casing 46.

And, in case where torque is transmitted to the input shaft 2 as the engine is put into operation, this torque is transmitted not only to the first input disk 10a through the loading cam device 24 but also to the second input disk 10b through the main shaft 4, thereby rotating these first and second input disks 10a, 10b.

The torque, which is input to the first and second input disks 10a, 10b, is transmitted through the first and second power rollers 14a, 14b to the first and second output disks 12a, 12b; and, at the then time, since the first and second power rollers 14a, 14b are controlled and inclinedly rotated by first and second supporting mechanism, gear change ratios, which are responded to inclined rotation angles of the first and second power rollers 14a, 14b, are generated in a continuously variable manner between the first input and output disks 10a, 12a as well as between the second input and outpost disks 10b, 12b.

By the way, the first and second output disks 12a, 12b according to the present embodiment are a unified type output disk which includes traction surfaces 54a, 54b, 54c, 54d on the two side portions thereof (which is hereinafter referred to as a unified type output disk 12A). On the side portion of the outer-most outside diameter portion of this unified-type output disk, there is formed a datum plane 56 which serves as a machining datum when working the traction surfaces 54a, 54b, 54c, 54d. The length m of the datum plane 56 in the diameter direction thereof (that is, the direction which intersect at right angles to the axis of the main shaft 4) is set at least 2 mm or more. Also, an operation for finishing the datum plane 56 is executed after the unified output disk 12A is heat treated.

And, referring to the operation for working the unified output disk 12A, for example, according to a working method disclosed in JP-A-2000-61702, while the datum plane 56 is matched to the datum surface of a working apparatus such as a lathe, the traction surfaces 54a, 54b, 54c, 54d are processed.

As in the above-mentioned structure, by working the unified-type output disk 12A including the datum plane 56 on the side portion of the outer-most outside diameter portion thereof, the whirling of the outside diameter portion when working the traction surfaces 54a, 54b, 54c, 54d can be reduced, so that, in the grinding operation or in the superfinishing operation, the traction surfaces 54a, 54b, 54c, 54d can be ground with high precision. Therefore, in the case of a toroidal-type continuously variable transmission incorporating therein the present unified type output disk 12A, the power transmission efficiency thereof can be prevented from being lowered and the gear change operation thereof can be prevented from being unstabilized.

Also, due to heat treatment, the unified type output disk 12A is deformed to a slight degree; however, according to the present embodiment, since the finishing operation of the datum plane 56 is carried out after enforcement of the heat treatment of the unified type output disk 12A, the influence of the deformation of the unified type output disk 12A can be eliminated to thereby be able to enhance the plane precision of the datum plane 56. Therefore, in the case of the unified type output disk 12A including the datum plane 56 of high plane precision, the working of the traction surfaces 54a, 54b, 54c, 54d can be executed with high precision.

Figure 2:
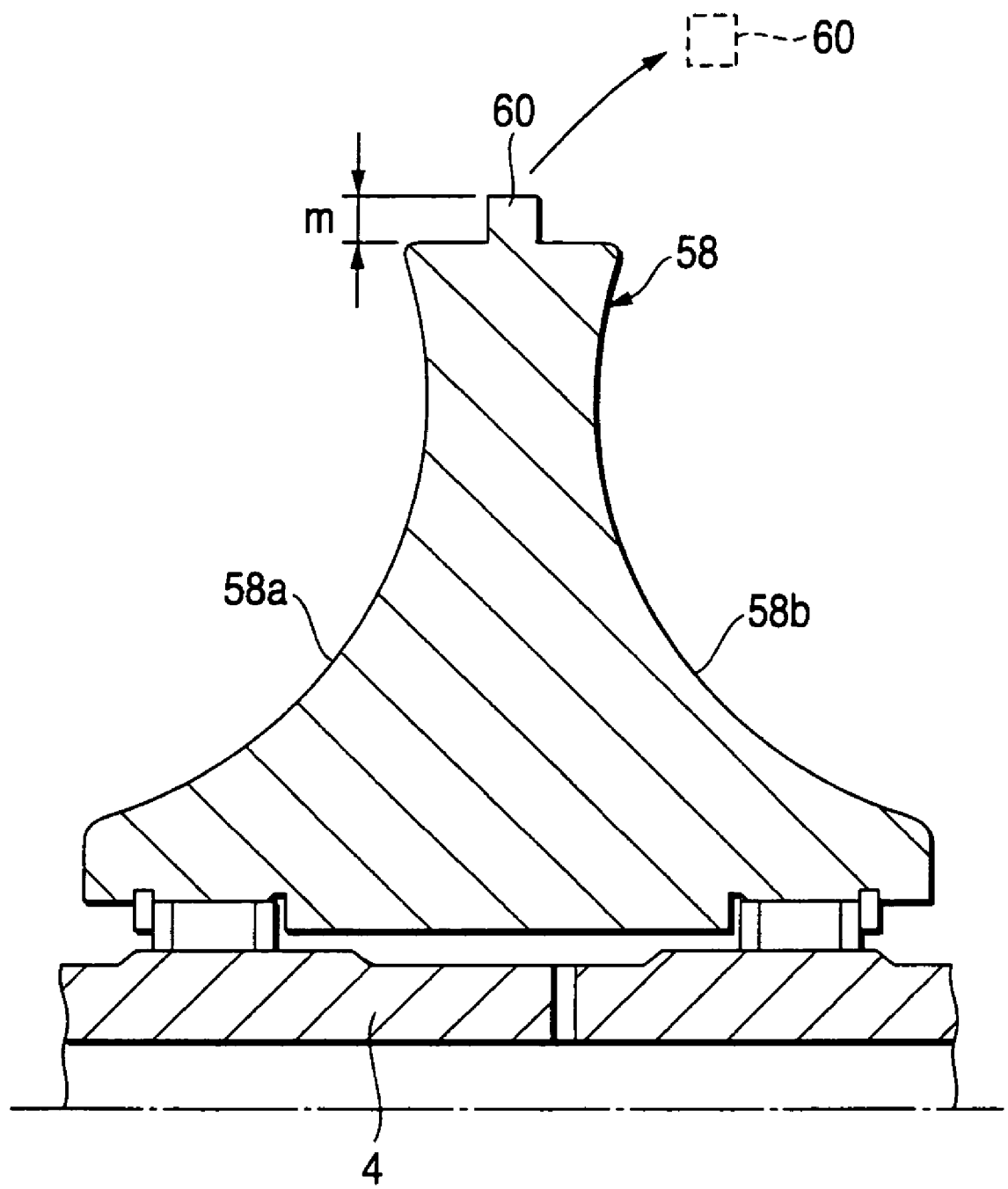
FIG. 2 is a section view of a unified type output disk according to a second embodiment of the invention; and, FIG. 3 is a section view of a unified type output disk according to a third embodiment of the invention.

Next, FIG. 2 is a half section view of a unified type output disk 58 according to a second embodiment of the invention.

The unified type output disk 58 according to the second embodiment includes traction surfaces 58a, 58b on the two side portions thereof (by the way, although not shown, on the portion of the disk 58 that is situated lower than the main shaft 4 as well, there are formed other two traction surfaces). In the end portion of the outer-most outside diameter portion of the present unified type output disk, there is formed a stepped portion 60 which serves as a machining datum when working the traction surfaces 58a, 58b. The length m of the stepped portion 60 in the diameter direction thereof (that is, the direction which intersect at right angles to the axis of the main shaft 4) is set at least 2 mm or more.

Also, an operation for finishing the stepped portion 60 is carried out after enforcement of the heat treatment of the unified type output disk 58.

And, referring to an operation for working the unified output disk 58, for example, according to a working method disclosed in JP-A-2000-61702, while the stepped portion 60 is matched to the datum recessed portion of a working apparatus such as a lathe, the traction surfaces 58a, 58b may be processed.

And, in case where the working operation of the traction surfaces 58a, 58b and all of the remaining working operations are completed, the stepped portion 60 is cut and removed to thereby provide a unified type output disk 58 which does not include the stepped portion 60.

As in the above-mentioned structure, by working the unified-type output disk 58 including the stepped portion 60 provided on the end portion of the outer-most outside diameter portion thereof, the whirling of the outside diameter portion when working the traction surfaces 58a, 58b can be reduced, so that, in the grinding operation or in the superfinishing operation, the traction surfaces 58a, 58b can be ground with high precision. Therefore, in the case of a toroidal-type continuously variable transmission incorporating therein the present unified type output disk 58, the power transmission efficiency thereof can be prevented from being lowered and the gear change operation thereof can be prevented from being unstabilized.

Also, since the operation for finishing the stepped portion 60 is carried out after enforcement of the heat treatment of the unified type output disk 58, there can be eliminated the influence of the deformation of the unified type output disk 58, which makes it possible to enhance the plane precision of the wall surface of the stepped portion 60. Therefore, in the case of the unified type output disk 58 including the stepped portion 60 which is high in plane precision, the traction surfaces 58a, 58b can be processed with high precision.

Further, because the stepped portion 60 is cut and removed after all of the working operations of the unified type output disk 58 are completed, the weight of the unified type output disk 58 can be reduced, the fuel efficiency thereof can be enhanced and the assembling efficiency can also be improved. In addition, since the moment of inertia of the output disk 58 is also reduced, the controlling performance thereof can be enhanced, so that the responding performance of the output disk 58 to a sudden gear change can be enhanced.

Figure 3:
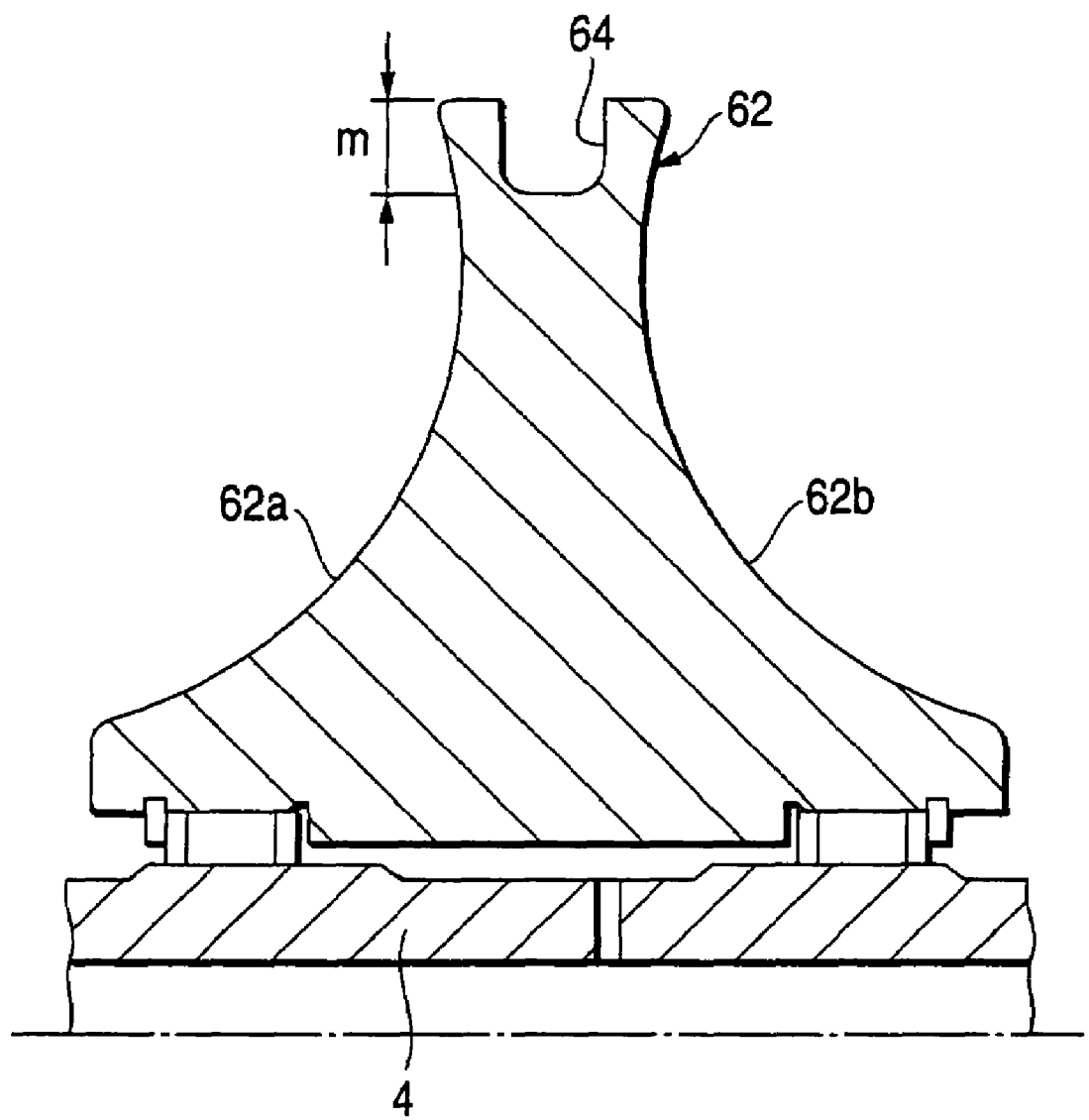

Next, FIG. 3 is a half section view of a unified output disk 62 according to a third embodiment of the invention.

The unified type output disk 62 according to the third embodiment includes traction surfaces 62a, 62b on the two side portions thereof (by the way, although not shown, on the portion of the disk 62 that is situated lower than the main shaft 4 as well, there are formed other two traction surfaces). In the end portion of the outer-most outside diameter portion of the present unified type output disk, there is formed a groove portion 64 which serves as a machining datum when working the traction surfaces 62a, 62b. The length m of the wall surface of the groove portion 64 in the diameter direction thereof (that is, the direction which intersect at right angles to the axis of the main shaft 4) is set at least 2 mm or more.

Also, the operation for finishing the groove portion 64 is carried out after enforcement of the heat treatment of the unified type output disk 62.

And, referring to the operation for working the unified output disk 62, for example, according to a working method disclosed in JP-A-2000-61702, while the groove portion 64 is matched to the datum projecting portion of a working apparatus such as a lathe, the traction surfaces 62a, 62b may be processed.

As in the above-mentioned structure, by working the unified-type output disk 62 including the groove portion 64 formed in the end portion of the outer-most outside diameter portion thereof, the whirling of the outside diameter portion when working the traction surfaces 62a, 62b can be reduced, so that, in the grinding operation or in the superfinishing operation, the traction surfaces 62a, 62b can be ground with high precision. Therefore, in the case of a toroidal-type continuously variable transmission incorporating the present unified type output disk 62 therein, the power transmission efficiency thereof can be prevented from being lowered and the gear change operation thereof can be prevented from being unstabilized.

Also, since the operation for finishing the groove portion 64 is carried out after enforcement of the heat treatment of the unified type output disk 62, there can be eliminated the influence of the deformation of the unified type output disk, which makes it possible to enhance the plane precision of the wall surface of the groove portion 64. Therefore, in the case of the unified type output disk 62 including the groove portion 64 which is high in plane precision, the traction surfaces 62a, 62b can be processed with high precision.

Further, provision of the groove portion 64 can reduce the weight of the unified type output disk 62, can enhance the fuel efficiency thereof and can improve the assembling efficiency thereof. Also, since the moment of inertia of the output disk 62 is also reduced, the controlling performance thereof can be enhanced, so that the responding performance of the output disk 62 to a sudden gear change can be enhanced.

By the way, in the above respective embodiments, description has been given of a half-toroidal-type toroidal-type continuously variable transmission; however, even in case where the above-described unified type output disk is employed in a full-toroidal-type toroidal-type continuously variable transmission, there can also be obtained similar operation effects.

As has been described heretofore, according to a toroidal-type continuously variable transmission of the invention, there can be reduced the whirling of the outside diameter portion of a unified type output disk when working the traction surfaces of the present output disk and thus, in the grinding operation and superfinishing operation of the unified type output disk, the traction surfaces thereof can be ground with high precision. Thanks to this, in the case of a toroidal-type continuously variable transmission which incorporates the present unified type output disk therein, the power transmission efficiency thereof can be kept from being lowered and the stability of the gear change operation thereof can be enhanced.

Also, since the operation for finishing the datum plane is carried out after enforcement of the heat treatment of the unified type output disk, there can be eliminated the influence of the deformation of the unified type output disk, thereby being able to enhance the plane precision of the datum plane. Thanks to this, the working of the traction surfaces of the unified type output disk can be executed with high precision.

And, according to the toroidal-type continuously variable transmission of the invention, since the traction surfaces of a unified type output disk can be ground with high precision, in the case of a toroidal-type continuously variable transmission which incorporates the present unified type output disk therein, the power transmission efficiency thereof can be kept from being lowered and the stability of the gear change operation thereof can be enhanced.

Also, since the operation for finishing the stepped portion is carried out after enforcement of the heat treatment of the unified type output disk, there can be eliminated the influence of the deformation of the unified type output disk, which makes it possible to enhance the plane precision of the wall surface of the stepped portion. Therefore, the traction surfaces of the unified type output disk can be processed with high precision.

And, according to the invention, because the stepped portion is cut and removed after all of the working operations of the unified type output disk are completed, the weight of the unified type output disk can be reduced, the fuel efficiency thereof can be enhanced and the assembling efficiency can also be improved. Also, since the moment of inertia of the unified type output disk is also reduced, the controlling performance thereof can be enhanced, so that the responding performance of the present output disk to a sudden gear change can be enhanced.

Further, according to a toroidal-type continuously variable transmission of the invention, since it incorporates therein a unified type output disk which includes a groove portion as a machining datum, the power transmission efficiency thereof can be kept from being lowered and the stability of the gear change operation thereof can be enhanced.

Also, because the operation for finishing the groove portion is carried out after enforcement of the heat treatment of the unified type output disk, there can be eliminated the influence of the deformation of the unified type output disk, which makes it possible to enhance the plane precision of the wall surface of the groove portion. Therefore, the traction surfaces of the unified type output disk can be processed with high precision.

What is claimed is:

1. A method of making a unified disk for a continuously variable transmission, the method comprising:
    forming first and second disks as a unified disk including on two side surfaces thereof traction surfaces configured for contacting with a pair of power rollers;
    forming a stepped portion projected from an outside diameter of said unified disk, wherein the stepped portion serves as a machining datum when said traction surfaces are processed;
    heat treating said unified disk; and
    after said heat treating, performing a finishing operation on said stepped portion; and
    removing said stepped portion after said traction surfaces are processed.

* * * * *